(12) United States Patent
Becker Hof (10) Patent No.: US 9,419,815 B2
(45) Date of Patent: Aug. 16, 2016

(54) DOMAIN-LESS SERVICE SELECTION (71) Applicant: Ericsson AB, Stockholm (SE)

(72) Inventor: Onno Mark Becker Hof, Zoetermeer (NL)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 14/586,755

(22) Filed: Dec. 30, 2014

(65) Prior Publication Data

US 2015/0372836 A1   Dec. 24, 2015

Related U.S. Application Data

(63) Continuation of application No. 13/225,369, filed on Sep. 2, 2011, now Pat. No. 8,924,554, which is a continuation of application No. 10/464,233, filed on Jun. 17, 2003, now Pat. No. 8,037,299.

(60) Provisional application No. 60/389,702, filed on Jun. 18, 2002.

(51) Int. Cl.
| | |
|---|---|
| *H04L 29/06* | (2006.01) |
| *H04L 12/28* | (2006.01) |
| *H04L 29/08* | (2006.01) |
| *H04L 29/12* | (2006.01) |
| *H04W 12/04* | (2009.01) |
| *H04M 7/00* | (2006.01) |
| *H04W 12/06* | (2009.01) |

(52) U.S. Cl.
CPC ........ *H04L 12/2856* (2013.01); *H04L 12/2876* (2013.01); *H04L 29/12009* (2013.01); *H04L 29/12594* (2013.01); *H04L 29/12783* (2013.01); *H04L 61/30* (2013.01); *H04L 61/35* (2013.01); *H04L 63/08* (2013.01); *H04L 67/16* (2013.01); *H04L 67/2838* (2013.01); *H04L 67/2852* (2013.01); *H04W 12/04* (2013.01); *H04L 69/329* (2013.01); *H04M 7/006* (2013.01); *H04W 12/06* (2013.01)

(58) Field of Classification Search
CPC ......................... H04L 67/2838; H04L 67/2852
See application file for complete search history.

(56) References Cited

U.S. PATENT DOCUMENTS

| | | | |
|---|---|---|---|
| 6,401,085 B1 * | 6/2002 | Gershman | G06F 17/30867 |
| 2001/0034771 A1 * | 10/2001 | Hutsch | G06F 9/541 709/217 |
| 2002/0062373 A1 * | 5/2002 | Skingle | H04L 63/029 709/225 |
| 2003/0158912 A1 * | 8/2003 | Simpson | H04L 29/06 709/218 |

* cited by examiner

*Primary Examiner* — Barbara Burgess
(74) *Attorney, Agent, or Firm* — Nicholson De Vos Webster & Elliott LLP (57) ABSTRACT

A method and apparatus for providing domainless service selection (DLSS) are described. According to one embodiment of the invention, there is a service selection network element used to provide access of computing devices to a set of one or more services provided by a set of one or more providers. In addition, a web portal allows subscribers to log in and/or select/switch between the services and providers. Responsive to such action by a given subscriber, the web portal causes a record of that subscriber to be altered to reflect the action and causes the service selection network element to attempt to connect the subscriber accordingly. According to certain embodiments of the invention, subscribers' domainless user identifiers are merged by the service selection network element with domain names (stored in a database) of services/providers to form network addresses (e.g., Internet addresses).

8 Claims, 6 Drawing Sheets

WHOLESALE PORTAL WINDOW - BROWSER NAME

WELCOME TO THE SERVICE PORTAL

LOGO OR ADD

USERNAME: ____
PASSWORD: ____

[LOGIN]  [RESET]

LOGO OR ADD

FIG. 7B

HTTP://LOCALHOST/CHECKUSER.PHP - BROWSE...

PORTAL SERVICE MANAGER

LOGO OR ADD

EUROPE CONNECT BASIC ▽    [UPDATE]

LOGO OR ADD

DOMAIN-LESS SERVICE SELECTION

CROSS-REFERENCE TO RELATED APPLICATIONS

This application is a continuation of application Ser. No. 13/225,369, filed Sep. 2, 2011, which is a continuation of application Ser. No. 10/464,233, filed Jun. 17, 2003, which claims the benefit of U.S. Provisional Application No. 60/389,702, filed Jun. 18, 2002, which are hereby incorporated by reference.

FIELD

Embodiments of the invention relate to the field of communications; and more specifically, to domainless service selection.

BACKGROUND

In the field of communications, the need for high-speed transmission of data, including video and audio, has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service (both using a POTS line), and cable modem service over a Radio Frequency (RF) cable line. Further, other types of content providers may enable a subscriber to receive different types of media, such as a video stream, audio stream, etc.

Typical approaches to network connectivity for certain connection services (including cable modem service) are such that a group of subscribers are pooled together and treated as an individual entity (non-channelized media). Such an approach does not allow for individualized accounting and/or usage tracking for different subscribers connecting to the network.

In contrast, other approaches to network connectivity for certain connection services do allow for individualized treatment of subscribers (channelized media). Disadvantageously, these techniques require specialized software and/or hardware to be executing on the individual subscriber/client machines to allow for this individualized approach. In particular, DSL service can provide for this individualized treatment by using software and/or hardware that allows for the Point-to-Point Protocol over X protocol (e.g., where X can be a variety of different protocols, including Ethernet (PPPoE) and ATM (PPPoA)). Accordingly, the costs of such services are increased to account for this additional software and/or hardware. Advantageously, using PPP allows for the use of structured PPP usernames to aid the network access provider in a wholesale scenario. In such a scenario, the network access provider's network element needs to know the requested destination of a subscriber. To provide this information, a subscriber can create a structured PPP username by merging their username with a domain name. The provision of this structured PPP username to the network access provider's network element with PPP allows the network element to determine the requested destination. In other words, the subscriber performs the selection through the structured PPP user name.

In addition, typical approaches for network connectivity to a given service or content provider statically couples a customer premise equipment (CPE), such as a modem or personal computer, to the service requested (be it a type of service and/or content).

BRIEF SUMMARY

A method and apparatus for providing domainless service selection (DLSS) are described. According to one embodiment of the invention, there is a service selection network element used to provide access of computing devices to a set of one or more services provided by a set of one or more providers. In addition, a web portal allows subscribers to log in and/or select/switch between the services and providers. Responsive to such action by a given subscriber, the web portal causes a record of that subscriber to be altered to reflect the action and causes the service selection network element to attempt to connect the subscriber accordingly. According to certain embodiments of the invention, subscribers' domainless user identifiers are merged by the service selection network element with domain names (stored in a database) of services/providers to form network addresses (e.g., Internet addresses).

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1A. However, element numbers are the same for those elements that are the same across different Figures. In the drawings.

DETAILED DESCRIPTION

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

A method and apparatus for providing domainless service selection (DLSS) are described. According to one embodiment of the invention, there is a service selection network element used to provide access of computing devices to a set of one or more services provided by a set of one or more providers. In addition, a web portal allows subscribers to log in and/or select/switch between the services and providers. Responsive to such action by a given subscriber, the web portal causes a record of that subscriber to be altered to reflect the action and causes the service selection network element to attempt to connect the subscriber accordingly. According to certain embodiments of the invention, subscribers' domainless user identifiers are merged by the service selection network element with domain names (stored in a database) of services/providers to form network addresses (e.g., Internet addresses). Certain such embodiments of the invention do not exclude structured username, which include a domain name. Rather, they also allow usernames which include domains to be re-written with new domain information. This allows agnostic handling of different access technologies while maintaining one common interface.

Exemplary embodiments of the invention will now be described with reference to FIGS. 1-4. In particular, the operations of the flow diagrams in FIGS. 1 and 2 will be described with reference to the exemplary embodiments of FIGS. 3 and 4. However, it should be understood that the operations of these flow diagrams can be performed by embodiments of the invention other than those discussed with reference to FIGS. 3 and 4, and that the embodiments discussed with reference to FIGS. 3 and 4 can perform operations different than those discussed with reference to these flow diagrams.

Figure 3:
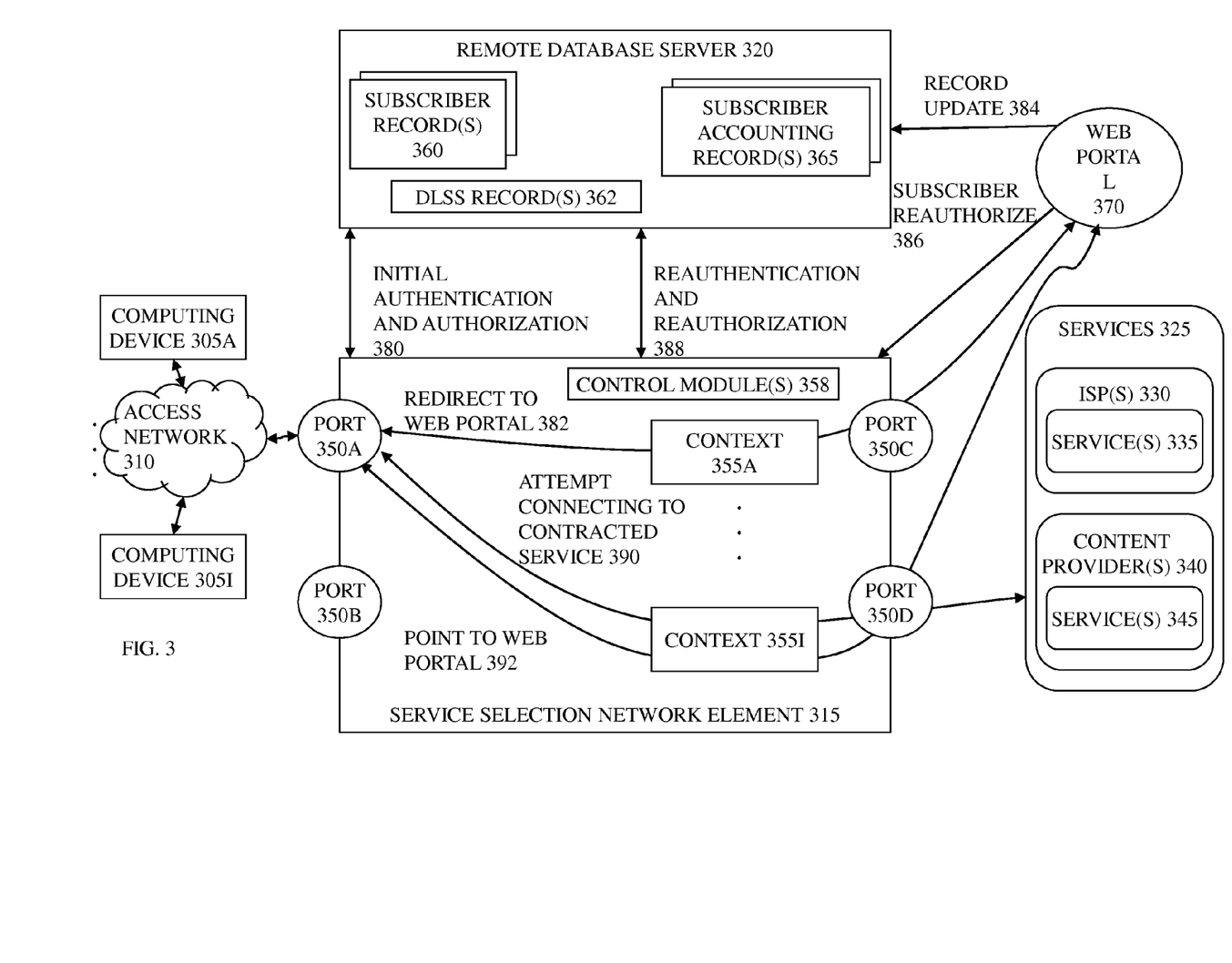
FIG. 3 illustrates an exemplary network configuration for domainless service selection according to one embodiment of the invention.

FIG. 3 illustrates an exemplary network configuration for domainless service selection according to one embodiment of the invention. In FIG. 3, a number of computing devices 305A-I can be communicatively coupled to a number of services 325 through a service selection network element 315. In FIG. 3, the services 325 include services provided by one or more Internet service providers 330 and one or more content providers 340. Each of the Internet service providers 330 and content providers 340 may offer one or more different services (335, 345) (e.g., speeds of connection, particular content, etc.). Thus, the term service is used herein to include grades of network connections, accessibility of different items of content, etc. Each of the services can be represented by a number of different attributes, including type of media, amount of bandwidth, filters, type of usage (e.g., time based, prepaid, etc.), etc. FIG. 3 also illustrates a web portal 370 to allow the computing devices 305A-I to login and/or select/change between the services 325.

FIG. 3 illustrates the service selection network element 315 having a number of ports 350A-D, a number of contexts 355A-I, and a set of one or more control modules 358. Each of the contexts 355A-I represents module/units that each provide the functionality of a router, and thus operate as virtual routers in the service selection network element 315. Depending upon the configuration of the service selection network element 315, each of the contexts 355A-I can be associated with a different provider or service (e.g., an Internet service provider, a content provider, etc.) to allow for separation of traffic of different providers (e.g., for accounting and other purposes). Where a given context 355 is associated with a given ISP, that context may include a number of subnets that comprise a number of addresses (e.g., Internet Protocol (IP) addresses) that are to be dynamically assigned to subscriber/clients. However, a different or additional allocation of contexts is within the scope of the invention (e.g., different services of a given provider may be allocated different contexts, certain providers may share a single context, etc.).

By way of example, the computing devices 305A-I are coupled to the port 350A by an access network 310. In contrast, the ports 350C-D are used for communicating with the services 325 and the web portal 370. It should be understood that the orientation and representation of ports of the service selection network element 315 are simply for illustration purposes, and thus they are not restrictive upon the scope of the invention. In addition, it should be understood that any number of ways can be used for providing communication between the ports C and D of the service selection network element 315 and the web portal 370 and the services 325 according to well known techniques (e.g., a connection over the Internet, such as a virtual private network (VPN) using, for example, GRE tunneling, L2TP tunneling, ATM/FR logical channels, 802,1Q VLANS, direct IP connectivity, MPLS L2/L3 VPNS etc).

Different communication sessions between the computing devices 305 and the web portal 370/services 325 travel through one of the contexts 355A-I. Thus, each of the contexts 355A-I have interfaces to provide communication to the appropriate ones of the web portal 370/services 325, and also have interfaces to which the computing devices may be bound depending upon the service that has been selected by a subscriber. Thus, although FIG. 3 illustrates messaging and operations related to one port coupled to one interface of a context, the different ports, interfaces and contexts of the network element 315 can include the messaging and operations illustrated. While in one embodiment of the invention a number of interfaces are associated with a given port, in alternative embodiments of the invention a single interface is associated with a given port.

The control modules 358 handle various communications, protocols, network connections, bindings, etc. Additional details regarding various architectures for the service selection network element 315 are described later herein. While one embodiment is illustrated in which contexts are used inside the service selection network element 315, alternative embodiments of the invention do not use contexts.

FIG. 3 also illustrates a remote database server 320 storing data related to authentication, authorization and accounting for subscribers. In particular, FIG. 3 shows the remote database server 320 including subscriber records 360, domainless service selection (DLSS) records 362, and subscriber accounting records 365. In one embodiment, a given computing device 305A-I coupled to the network element 315 has an associated subscriber record 360, an associated DLSS record 362, and an associated subscriber accounting record 365. While FIG. 3 illustrates the subscriber records as part of the remote database server 302, it should be understood that they may, and often do, instead reside on equipment of different providers (e.g., where the remote database server 320 is owned by a wholesaler—see FIG. 4). While in one embodiment if the invention each subscriber record 360 includes certain information (the username and password shared between the subscriber and the provider; a set of policies) as described below, in alternative embodiments of the invention more, less or different information may be stored therein. While in one embodiment of the invention each DLSS record 362 acts as an entry in a state table and includes certain information (an identifier key (initial or updated); the portal username and portal password shared between the subscriber and the web portal; a set of policies) as described below, in alternative embodiments of the invention more, less or different information may be stored therein.

While in one embodiment of the invention the remote database server 320 is a Remote Access Dial In User Server (RADIUS) server (e.g., with a sequel (SQL) database, such as MySQL), alternative embodiments of the invention may use additional RADIUS servers and/or instead or additionally use other types of servers. It should be understood that any number of ways can be used for providing communication between the remote database server 320 and the service selection network element 315 according to well known techniques (e.g., a connection over the Internet, such as a VPN carrying a software program/script (e.g., perl based scripting, for RADIUS attribute/element modification and Pre-emptive Hypertext Processor (PHP) based web interfacing to link the necessary databases of both). In addition, while FIG. 3 illustrates that the service selection network element 315 and the remote database server as two separate elements, embodiments of the invention are not so limited. For example, in alternative embodiments, the database server 320 and/or the records therein can be incorporated into the service selection network element 315.

The access network 310 represents any number of different access networks using any number of different types of encapsulations, including PPPoX, 1483 bridged, clientless internet protocol (IP) selection (CLIPS), DHCP etc. Various exemplary configurations of the access network are described later herein. Additionally, FIG. 3 illustrates a number of different operations. These operations will be described with reference to the flow diagrams.

Figures 1, 2:
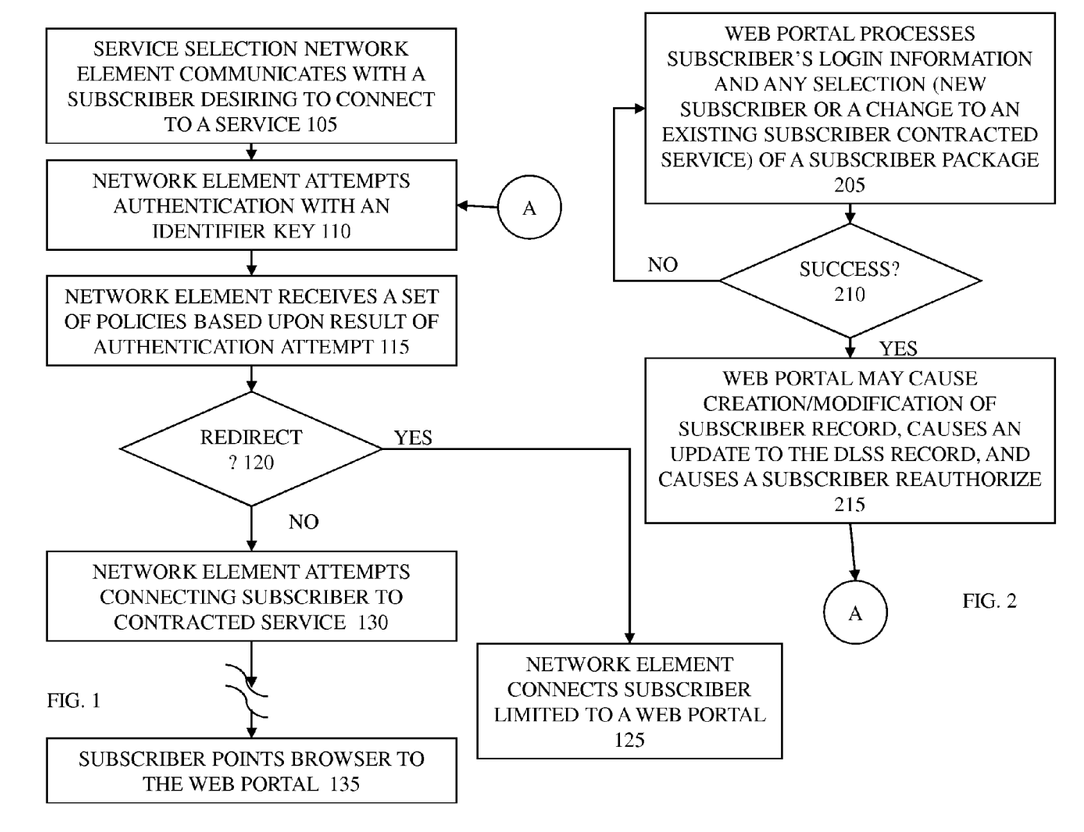
FIG. 1 is an exemplary flow diagram for a service selection network element according to one embodiment of the invention.
FIG. 2 is an exemplary flow diagram for a web portal to provide web portal based login/service selection according to one embodiment of the invention.

FIG. 1 is an exemplary flow diagram for a service selection network element according to one embodiment of the invention. FIG. 1 begins with block 105. As shown in block 105, a service selection network element receives communication(s) from a subscriber desiring to connect to a service and control passes to block 110. With reference to FIG. 3, assume the service selection network element 315 receives communications from the computing device 305A. In one embodiment of the service selection network element 315, these communications can take a variety of forms depending upon the type of protocols and units used by the access network 310.

For instance, when PPP is used a PPP username will be provided by the computing device 305A to the service selection network element 315. When DHCP is used, a username typically is not provided by the computing device 305A to the service selection network element 315; but in such situations the Media Access Control (MAC) address of the hardware in the computing device 305A is provided. The use of DHCP and CLIPS on the network element allows capture of the MAC address automatically on any DHCP state change occurring in the connection between computing device 305A and the network element 315. In addition or alternatively the DHCP and CLIPS implementation on the network element allows capture of the MAC address of the CPE modem acting as DHCP relay as well. The implementation of the access network also affects what is in these communications. For instance, when the access network is connection oriented; each computing device 305A is uniquely identified by a circuit identifier (This is applicable for all types of Access protocols). However, when the access network is connectionless, each computing device 305 is not uniquely identified by a circuit identifier (Computing devices can share the same circuit identifier, optionally logically divided in multiple groups).

While one embodiment of the invention the service selection network element 315 is capable of being connected through different types of access networks (different encapsulations and/or hardware), alternative embodiments of the invention may be limited to a smaller number or only one.

Whether it be a PPP user name, a MAC address, a command line interface (CLI), a derivative thereof, or some other value, some value is initially used to distinguish between the different ones of the computing devices 305A-I in block 105; this value is referred to herein as the initial identifier key.

Certain embodiments of the invention are implemented to use only domainless identifier keys, whereas other embodiments of the invention allow for both domainless and domained identifier keys. A domainless identifier key is simply one which does not include a domain name, whereas a domained identifier key does include a domain name. To provide an example, assume that PPP is used. When using PPP, the PPP user name typically includes an Internet address (user name @ domain name). Where such an Internet address is used as the PPP user name, the service selection network element 315 may simply strip the domain name to form a domainless identifier key. Of course, a convention of not including a domain name when forming PPP user names may be adopted (the PPP user name is typically entered into the computing device; as such, a user may simply enter a domainless PPP user name (e.g., their telephone number)). Either way, the resulting username is unstructured, and therefore agnostic for destinations (destination independent); in other words the client PPP stack does not have to have knowledge regarding the destination. It should be understood that a value like a MAC address is domainless. Additional detail regarding domainless identifier keys is described in more detail with reference to FIG. 4.

In block 110 (FIG. 1), the network element attempts authentication with an identifier key and control passes to block 115. As describer later herein, depending on whether block 110 is reached from block 105 or block 215 and the implementation, this identifier key may be the initial identifier key or an updated identifier key. With reference to FIG. 3, the service selection network element 315 communicates with the remote database server 320 in an attempt to authenticate as illustrated by the initial authentication and authorization operation 380 (e.g., see authentication/access-request message from RFC 2138). While in one embodiment of the invention the identifier key includes the circuit identifier described above (e.g., where a RADIUS server is used as the remote database server 320 and a RADIUS access request (also referred to as a request for context) is used, the circuit identifier would be included in the user name field of this request), alternative embodiments of the invention may use a different value(s).

Responsive to receipt of the authentication request with the identifier key, the remote database server 320 accesses the DLSS records 362 in an attempt to determine if the subscriber is known or unknown. Where the subscriber is known, a DLSS record will be present that includes a set of policies to be used when connecting that subscriber. For instance, this set of policies can include a domain, filter(s), bandwidth, type of usage (time based, prepaid, etc.), access control lists, etc. This set of policies of the known user would have been previously stored responsive to some subscriber selection event (e.g., using well known techniques, or using the web portal 370 as described later herein). Where the subscriber is unknown, a set of default policies is identified.

In certain embodiments of the invention, the set of policies may include a redirect policy. A redirect policy indicates that the subscriber should be redirected to the web portal 370. Different embodiments of the invention may allow for the configuration of the redirect policy for different situations. For example, a redirection policy may be included for at least certain known subscribers to require them to login as later described herein. Such a forced redirection to the web portal 370 ensures that such subscribers will receive a home page (e.g., of the web portal 370) that can include information and/or advertising (thus, a wholesaler operating the service selection network element can enforce a login page where a subscriber must select his desired destination, instead of such selection occurring through the subscriber entering at their computing device a network address as a domained PPP username). As another example, a redirection is used for new subscribers in order to establish a record of them and allow them to self-select their service. While in certain embodiments of the invention, a separate context is used for unknown subscribers (referred to as the portal context), alternative embodiments of the invention do not use a separate context and/or do not implement contexts at all.

When there is a DLSS record present and redirection is not going to occur (i.e., there is no redirect policy or it has been satisfied by a login as described later herein; in other words, either a known subscriber without a redirect policy has arrived by block 105 or control has passed to block 110 from block 215), the remote database server 320 authenticates against the subscriber records (e.g., depending on the implementation and environment, against the subscriber records 360 stored in the remote database server 320, or in the subscriber records of the appropriate provider). This is described in more detail with reference to FIG. 4.

As shown in block 115, the network element receives the set of policies based upon the result of the authentication attempt and control passes to block 120. With reference to FIG. 3, the service selection network element 315 receives the set of policies provided by the remote database server 320 as part of the initial authentication and authorization operation 380 (e.g., see authorization/access-reply message from RFC 2138).

In block 120, the network element determines if there is a redirect policy in the set of received policies. If so, control passes to block 125; otherwise, control passes to block 130.

As shown in block 125, the network element connects a subscriber in a manner that the subscriber is limited to accessing a web portal. With reference to FIG. 3, the service selection network element 315, responsive to a redirect policy in the set of policies received as part of the initial authentication and authorization operation 380, connects the subscriber to the web portal 370 through the designated context (in FIG. 3, the context 355A) as illustrated by the redirect to portal operation 382. As such, regardless of the URL entered into a web browser by the subscriber, the subscriber will be redirected to the web portal 370. As described later herein, certain embodiments of the invention implement the web portal to allow subscribers to login and/or select/change between the services provided by the providers. It should be noted that connecting the subscriber through the designated context includes assigning an IP address (if there is not a static IP address) to the subscriber.

As shown in block 130, the network element attempts connecting the subscriber to the contracted service. With reference to FIG. 3, the service selection network element 315, responsive to the set policies received as a result of the initial authentication 380, connects the subscriber to the contracted service (e.g., one of the services provided by the providers in services 325) through the designated context (illustrated in FIG. 3 as the context 355I) as illustrated by the attempt connecting to contracted service operation 390. It should be noted that connecting the subscriber through the designated context includes assigning an IP address (if there is not a static IP address) to the subscriber.

As illustrated in the block 130 of FIG. 1, at any point later the subscriber may use this connection to point their web browser to the web portal. With reference to FIG. 3, the URL of the web portal 370 may be entered into the browser of a connected computing device 305 as illustrated by the point to web portal operation 392 (where the entering can occur by a number of different methods, including typing, clicking on a link, etc.).

It should be noted that as part of the connecting of the subscriber according to the set of policies (be it in block 125 or block 130), the service selection network element 315 may communicate the establishment of that session to the remote database server 320 to create/update the accounting records according to the set of policies. For example, such communications can include an accounting request message from the service selection network element to the remote database server, as well as an accounting acknowledgement message back. In certain embodiments of the invention, the accounting request message includes additional information used to form an updated identifier key. Such additional information includes the assigned IP address of the subscriber, as well as, in certain embodiment of the invention, a session identifier assigned to the session by the service selection network element 315 (the session identifier represents any tracking value for a communication session, including a random number chosen by the service selection network element 315 according well known techniques). This additional information is stored in the DLSS record 362 of the subscriber. The updated identifier key may be generated a variety of ways, including some or all of this additional information, some combination of some or all of this additional information and some or all of the information from the initial identifier key, etc. By way of example, and not by limitation, the updated identifier key may be: 1) IP address and session ID combined with, if available, the PPP username, the circuit ID, and/or the MAC address, or some derivative thereof. In other words, updated identifier keys are used by the service selection network element 315 to identify the virtual circuits formed between the service selection network element 315 and any one of the computing devices 305A-I attempting to make a connection. When such accounting is done as a result of a redirect, the accounting is referred to as interim accounting. The interim accounting will allow tracking the update/change of a subscriber's policy by the remote database server and accordingly service provider and web portal.

FIG. 2 is an exemplary flow diagram for a web portal to provide web portal based login/service selection according to one embodiment of the invention. Thus, FIG. 2 illustrates an example of what the web portal from FIG. 1 can be implemented to accomplish. Of course, alternative embodiments of the invention could implement the web portal to do more, less and/or different types of operations.

In block 205, the web portal processes the subscriber's login information and any selection (new subscriber or a change to an existing subscriber's contracted service) of a subscriber package. From block 205, control passes to block 210. With reference to FIG. 3, a computing device 305 connected to the web portal 370 is provided with the ability to navigate through a set of one or more web pages provided by the web portal 370. These web pages may include a variety of information and/or interactive content, including the entry of information by the subscriber. For instance, in one embodiment of the invention, the subscriber is initially provided with a home page including a link to a set of one or more pop-up windows that represent a service portal. This set of windows representing the service portal provides the subscriber the opportunity to login (e.g., enter a portal user name and a portal password; wherein a wholesaler owns the service selection network element, these are referred to as the wholesale credentials) and select/change between the available services provided by the available providers. While in one embodiment the portal username may be used as the subscriber's telephone number, alternative embodiments may use a different value.

Figure 5:
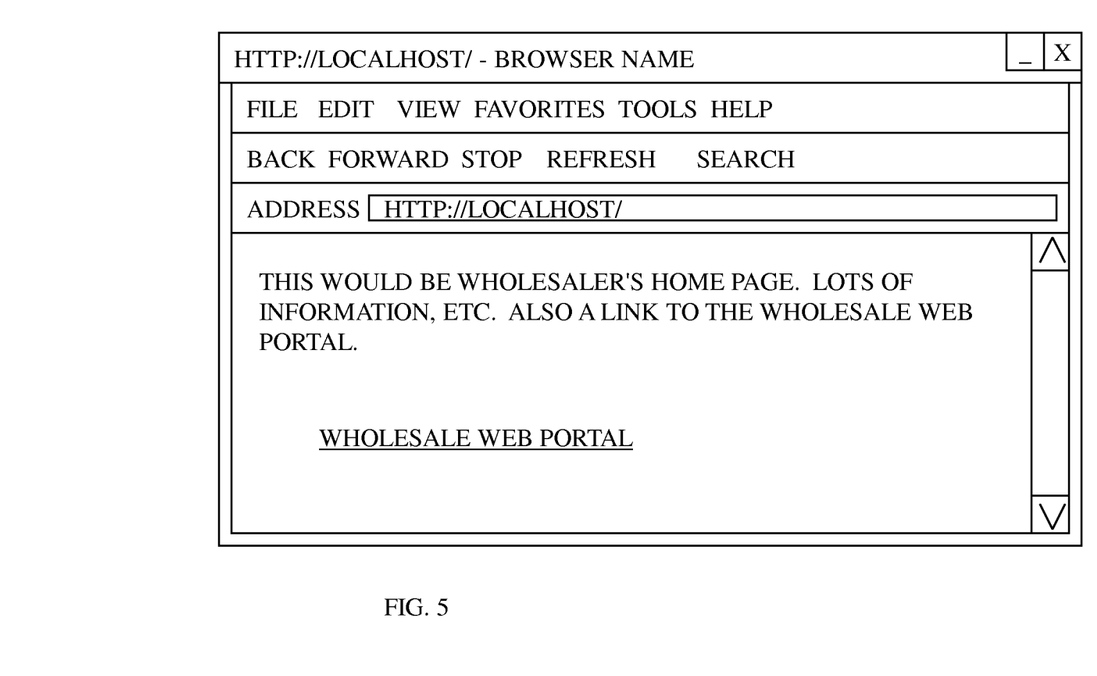
FIG. 5 is a block diagram illustrating a home page of the web portal with a link to the service portal, according to one embodiment of the invention.
Figure 6A:
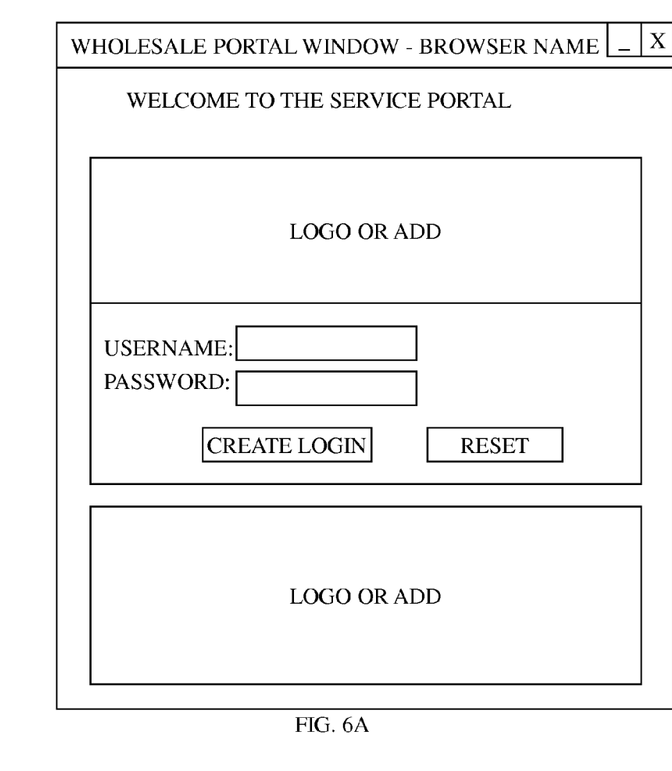
FIG. 6A is a diagram illustrating a new subscriber login pop-up window according to one embodiment of the invention.
Figure 6B:
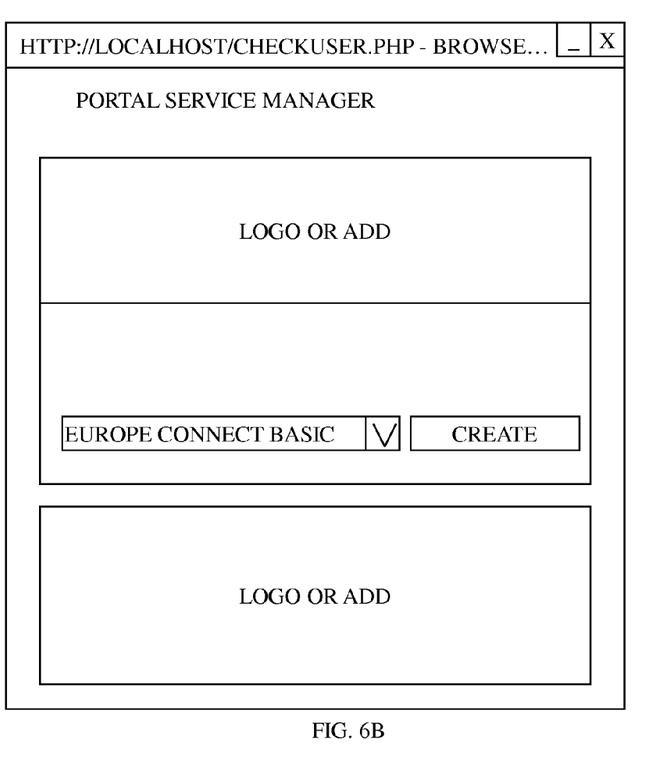
FIG. 6B is a new subscriber package selection (e.g., providers and services drop-down menu) pop-up window according to one embodiment of the invention.

FIGS. 5-7 illustrate an exemplary set of service portal pop up windows according to one embodiment of the invention. FIG. 5 is a block diagram illustrating a home page of the web portal with a link to the service portal, according to one embodiment of the invention. FIG. 6A is a diagram illustrating a new subscriber login pop-up window according to one embodiment of the invention. FIG. 6B is a new subscriber package selection (e.g., providers and services drop-down menu) pop-up window according to one embodiment of the invention. In this manner, a new subscriber connecting to the service selection network element 315 is provided with an opportunity to establish a portal user name and portal password for service selection, as well as select a service to be connected with as offered by the provider(s). With the pop-up windows of FIGS. 6A-B, a new subscriber can self-provision one of the available services provided by one of the available provider(s).

Figure 7A:
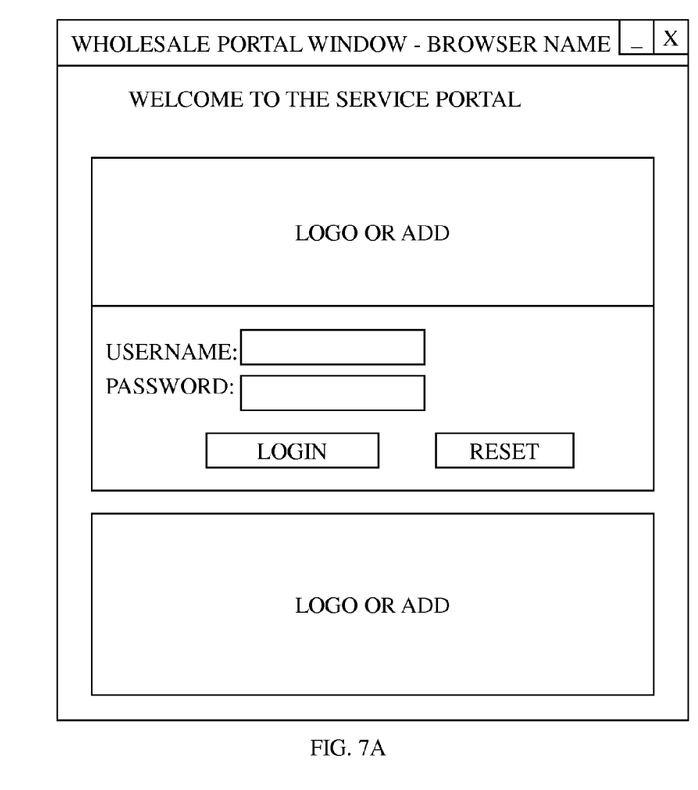
FIG. 7A is a known subscriber login pop-up window according to one embodiment of the invention.
Figure 7B:
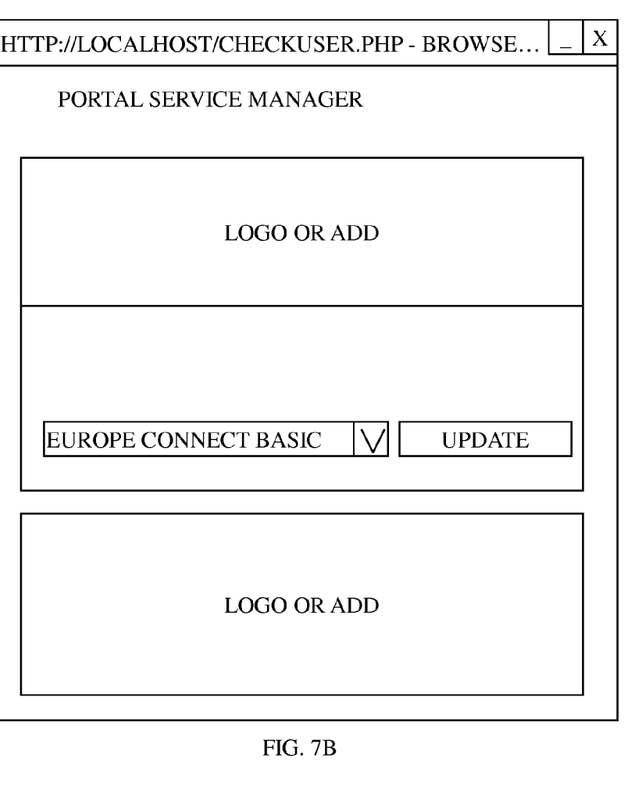
FIG. 7B is a diagram illustrating a known subscriber package change (e.g., providers and service types drop-down menu) pop-up window according to one embodiment of the invention.

FIG. 7A is a known subscriber login pop-up window according to one embodiment of the invention. In certain embodiments of the invention, the known subscriber login pop-up window of FIG. 7A is provided to the subscriber either: 1) as the result of a redirect policy that requires a subscriber to login each time that subscriber reconnects; or 2) as a result of a subscriber pointing their web browser to the web portal. FIG. 7B is a diagram illustrating a known subscriber package change (e.g., providers and service types drop-down menu) pop-up window according to one embodiment of the invention. With the pop-up windows of FIGS. 7A-B, an existing subscriber can self-provision a different one of the available services provided by one of the available providers Of course, additional information may be collected through the web portal (e.g., with other pop-up windows) from an unknown subscriber or when a known subscriber changes (e.g., payment method, contact information, etc.)

Thus, the web portal provides a service selection gateway. While one embodiment of the invention is described in which the login and package select/change pop-up windows are implemented as two separate windows, alternative embodiments of the invention may use the same, more or different pop-up windows. In addition, while embodiments of the invention are described in which the providers and services of those providers are selected from using a drop-down menu, alternative embodiments of the invention may use any type of selection mechanism. While in one embodiment of the invention the service portal pop-up windows resemble dial-up windows, alternative embodiments of the invention use a different type of window. In addition, while in certain embodiments of the invention these windows pop away upon successful entry of information and/or canceling, alternative embodiments require the subscriber to close the window.

As shown in block 210, it is determined if the processing in block 205 was successful. If so, control passes to block 215; otherwise, control passes to block 205.

In block 215, the web portal may cause creation/modification of the subscriber record (if necessary), causes an update to the DLSS record, and causes a subscriber reauthorize and control passes to block 110. For instance, if forced login is implemented for a known subscriber, the DLSS record for that subscriber is updated to reflect a successful login. As another example, if a new subscriber has successfully logged in and selected a subscriber package, that subscriber's DLSS record is updated to reflect the portal username, portal password, and set of policies associated with that subscriber (including the domain name (which indicates which context to be used), etc.). As another example, if the subscriber was a known subscriber that successfully logged in and picked a different subscriber package than the one they are currently connected with, that subscriber's DLSS record is updated to reflect the set of policies (including the domain name (which indicates which context to be used), etc.). associated with the newly selected subscriber package. The record update communication from the web portal to the remote database server includes information to allow the service selection network element to locate the DLSS record of the subscriber (e.g., information from the updated identifier key, such as the IP address (which can be captured by the web portal using well known techniques), the portal username (if a known subscriber), portal password (if a known subscriber), etc.). In addition, the web portal learns the session ID of this subscriber from the DLSS record.

The subscriber reauthorize command is to cause the service selection network element to connect the subscriber according to the updated DLSS record. The reauthorize command communication from the web portal to the service selection network element includes information to allow the service selection network element to identify the subscriber's current connection (e.g., one or more items from the updated identifier key, such as the session ID learned during the record update communication).

With regard to the subscriber record, any necessary creation/modification of a subscriber record (an unknown subscriber or a known subscriber that picked a different subscriber package) can be handled in a variety of different ways. For example, in certain embodiments of the invention the web portal server is maintained by a wholesaler and is capable of being selectively enabled (e.g., for different services/providers) to create/modify a subscriber record for the subscriber (if necessary). When enabled, the web portal server with the appropriate provider equipment (be it a providers server or the remote database server 320) to cause the creation/modification of the subscriber record. However, when not enabled, the subscriber record must be created/modified through different channels (e.g., some other communication between the subscriber and the provider, responsive to which the provider creates the subscriber record).

With reference to FIG. 3, the web portal 370 performs a record update operation 384 to update the appropriate one of the DLSS records 362 in the remote database server 320. In addition, the web portal 370 performs a subscriber reauthorize operation 386 to cause the service selection network element 315 to update the subscriber's connection. While in one embodiment of the invention the subscriber reauthorize operation 386 involves the web portal 370 causing an SNMP set command identifying the subscriber to be provided to the service selection network element 315, alternative embodiments may use more, less and/or different commands (e.g., SNMP clear, SNMP re-authentication, etc.).

When control returns to block 110 of FIG. 1, the network element again attempts authentication with an identifier key as previously described. In this situation, this identifier key will be the updated identifier key. With reference to FIG. 3, the re-authentication of the subscriber is illustrated by the re-authentication and authorization operation 388 between the service selection network element 315 and the remote database server 320. As a result of the DLSS record being updated responsive to the record update operation 384, the service selection network element 315, responsive to the subscriber reauthorize operation 386, will send an authentication request to the remote database server 320. The remote database server 320 will locate the DLSS record of the subscriber (which is now known), and authenticate against the subscriber records (e.g., depending on the implementation and environment, against the subscriber records 360 stored in the remote database server 320, or in the subscriber records of the appropriate provider). This is described in more detail with reference to FIG. 4. The remote database 320 will then respond to the service selection network element 315 with the set of policies in the updated DLSS record and attempt to establish a connection accordingly.

In addition, the remaining blocks of FIG. 1 would be performed, with the expectation that the subscriber would be connected to the contracted service in block 130 (however, in certain embodiments of the invention, a subscriber could be redirected again for different reasons—e.g., the subscriber was a new subscriber that just selected the service, part of that service requires a forced log in, and the system doesn't record that the subscriber just logged in to establish the service).

Typically, wherein a subscriber changes providers, the IP address needs to be changed. In such situations, the service selection network element enforces renegotiation of the IP address by terminating the existing session. While one embodiment is described where full renegotiation of the IP address is done on changes between different services (even within the same provider), alternative embodiments differentiate depending on whether a change in provider was made or not. In particular, where a change in services of the same provider is made that does not require a domain change (e.g., depending on configuration, a change in bandwidth parameters, filters, etc.), renegotiation of the IP address is not done. Rather, a soft renegotiation is performed where the same IP address is used. Thus, provider selection is based on session reestablishment (reestablishing a subscriber's binding), while such service selection is based on session refreshment (refreshing a subscribers binding). As such, in certain embodiments of the invention the subscriber reauthorize operation 386 involves the web portal selecting between the submittal of different commands depending on the change (e.g., a refresh command or a reestablish (such as a clear) command).

In one embodiment of the invention that uses PPP, persistent PPP connections are used on PPP clients. Such a persistent connection allows the computing device to run the PPP client in the background, and thus the user need not consider session establishment anymore. In such situations, when the provider is changed through the web portal, the web portal subscriber reauthorize operation causes the clearing of the existing PPP session. As a result, the PPP persistent connection will attempt to immediately establish a new session. As such, provider selection would be fully automatic and the subscriber does not need to do anything to complete the provider switch.

Thus, a method and mechanism for allowing for online service selection (provider and services of that provider, wherein a service may be access to a particular piece of content) and auto provisioning are described. In addition, embodiments of the invention are capable of enforcing contract parameters associated with different services through the set of policies enforced by the service selection network element (e.g., the service selection network element 315 applying the policies.). Additionally, embodiments may provide for captive enrollment with the redirect limited to the web portal, on-demand value add services, service bundles, etc.

It should also be noted that the service selection network element may be deployed into different environments. One such environment is where the service selection network element is owned and operated as part of a wholesaler's infrastructure. The providers of the services 325 rents from the wholesaler. Thus, the wholesaler commonly owns the subscriber circuit and charges on the service selected toward the provider and/or the subscriber. A provider commonly owns its subscriber's credentials and charges toward the subscriber. Thus, a subscriber may actually have two contracts: 1) a subscriber to wholesaler contract (subscriber can instruct wholesaler to switch to another service on demand, using the web portal); and 2) a subscriber to provider contract (the subscriber has an end-to-end relationship with the provider of choice; for this relationship, a PPP username and password may be maintained and know between the two entities). However, alternative environments are within the scope of the invention.

While different embodiments of the invention may implement the web portal in different ways, one embodiment of the invention uses a web server (e.g., one with PHP support) with a scripting language (e.g., perl and PHP). In addition, web portal information security can be provided in a variety or ways (or not at all). For example, in one embodiment of the invention every subscriber connected to the web portal has been assigned an IP address from the service selection network element. This information is stored in the remote database server 320 and a lookup will match the IP address in the DLSS record and subscriber IP address. If the web portal information (the IP address) doesn't match the IP address in the DLSS record, it can be assumed this subscriber is not entitled to change the service. As such, the subscriber location towards the web portal is locked.

Figure 4:
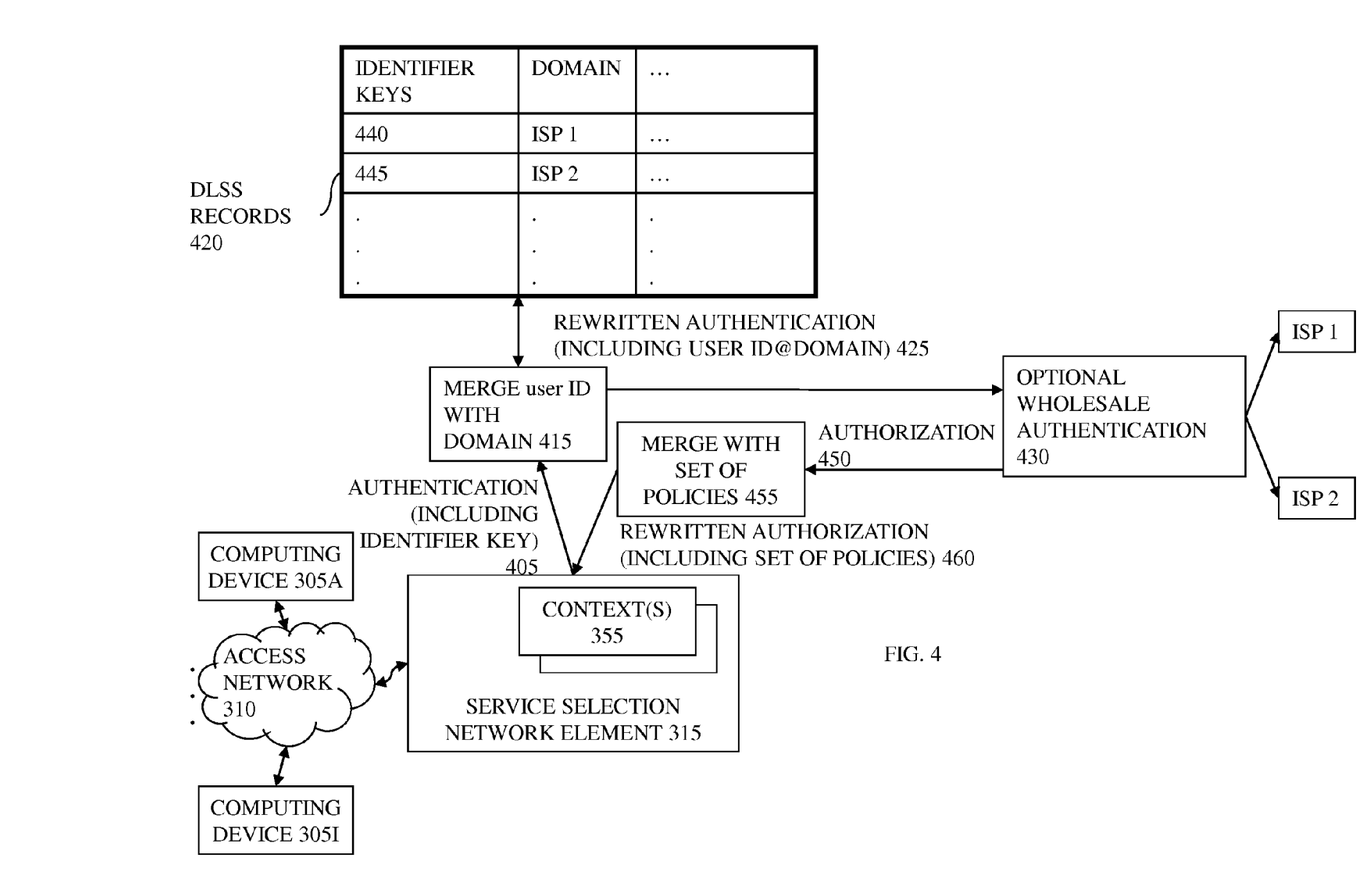
FIG. 4 illustrates a data flow diagram for authentication against subscriber records in a system with domainless service selection according to one embodiment of the invention.

FIG. 4 illustrates a data flow diagram for authentication against subscriber records in a system with domainless service selection according to one embodiment of the invention. FIG. 4 illustrates the computing devices 305A-I, the access network 310, and the service selection network element 315 including the contexts 355. However, rather than including the other elements from FIG. 3, FIG. 4 conceptually illustrates operations performed to merge a domainless user ID with a domain according to one embodiment of the invention.

In particular, FIG. 4 illustrates an authentication request (including an identifier key) operation 405 being performed by the service selection network element 315 responsive to one of the computing devices 305A-I attempting to connect. In one embodiment of the invention, this authentication request would be an initial authentication request for a known subscriber without a redirect policy, a reauthentication request for an unknown subscriber (one who is now know as a result of processing through the web portal), or a reauthentication request for a known subscriber with a redirect policy (one who has now logged in). Responsive to this authentication request, DLSS records 420 are consulted to determine the set of policies to be associated with that subscriber. In the example of FIG. 4, subscriber records are illustrated as storing identifier keys, a domain name, and any other information as previously described depending upon the implementation (e.g., other of the set of policies, portal username, portal password, etc.). Assuming that the identifier key from the authentication request operation 405 is present in the DLSS record 420, the domain name is retrieved and merged with a domainless user identifier to form an Internet address (user ID @ domain).

In one embodiment, the domainless user identifier is based on (is or is derived from) one or more items in the identifier key (e.g., where present, the domain less user ID may be based on the MAC address, domainless PPP username, circuit ID, etc.) As such, it should be understood that where PPP is used, a domainless user ID may be created as a result of the subscriber entering a domainless PPP user name or the service selection network element 315 stripping off a domain included by the subscriber in a domained PPP user name.

In the example of FIG. 4, there are two known subscribers recorded in the subscriber records: (1) a subscriber with identifier key 440 that is associated with a domain of ISP 1; and (2) a subscriber with identifiers key 445 associated with a domain of ISP 2. Assuming that the access request operation 405 is for the subscriber with identifier key 440, that identifier key would be used as the key to look up the subscriber's DLSS record (in this example, it stores the domain name of ISP 1). The domainless user ID based on the identifier key 440 would be merged with the domain name of ISP1 to form an Internet address.

In addition, a rewritten authentication operation 425 is performed. As part of this operation, an rewritten authentication request (based on the authentication request 405, but also including the Internet address (and, where implemented and such is available, a password (e.g., a PPP username from the subscriber, the portal username,)) is applied against the subscriber records. In the case of the wholesale scenario of FIG. 4, each provider maintains the subscriber records for their subscribers (see optional wholesale authentication 430 routing such a rewritten authentication request to the appropriate one of ISP 1 and ISP 2). Assuming all is acceptable, the result of applying the rewritten authentication request to the appropriate subscriber record is the receipt of an authorization response 450. Responsive to this authorization response 450, the remote database server 320 generates (block 455) and provides a rewritten authorization response 460 (which includes the set of polices retrieved from the DLSS record) to the service selection network element 315.

In this manner, all access protocols and their connection attempts are translated into a signaling communication protocol understood by the provider. Thus, the provider will always receive the protocol they are implemented to receive, regardless of the access network implementation. For example, where a provider is implemented to receive PPP, the authentication request 405, regardless of the access protocol used, will be rewritten into PPP as illustrated by the rewritten authentication request 425; as such, that provider will always receive domained PPP usernames and PPP password regardless of the usage of PPP protocols or DHCP protocols. Thus, although domainless service selection has been added with the service selection network element, certain embodiments of the invention are implemented such that nothing changed from the provider's perspective (e.g., there is actually no difference from what a provider receives—it still receives domained PPP usernames and PPP passwords).

In addition, in certain embodiments access protocols and their connection attempts are translated into a single signaling communication protocol understood by the provider. As such, providers will not see a difference between the different access protocols (as opposed to implementation that require providers to implement their own authentication mechanism for each separate access protocol.).

The use of the domainless user ID allows a subscriber to have the same user ID regardless of changes in services (including services of different providers). Where PPP is used, it allows a subscriber to enter a single domainless PPP user name and PPP password that can be used for different services (including services of different providers). As such, certain embodiments of the invention allow the subscriber to enter such a domainless PPP user name and PPP password only once at the computing device, even though such computing device may switch between different services. Of course, in such an embodiment, the user may or may not be allowed to alter their PPP user name and/or PPP password as needed, desired and/or allowed.

It should be understood that while the term ISP is used in FIG. 4, similar operations could be performed for other providers (e.g., content providers). In addition, it should be understood that alternative embodiments may implement more, less, and/or different operational flows. It should also be understood that while FIG. 4 shows a wholesale scenario, in alternative embodiments the service selection network element may have its own subscribers and maintain its own subscriber records.

Thus, FIG. 4 illustrates that the authentication and authorization is rewritten through the service selection network element 315. While not illustrated, it should be understood that similar action may be taken with regard to the associated accounting request and acknowledgement that would directly follow the authentication and authorization. In particular, while FIG. 3 illustrates accounting subscriber records in the service selection network element, there may also be accounting subscriber records maintained by the different providers on that provider's equipment. When present, these would need to be updated, and may be updated in a variety of ways. For example, they may be updated immediately as part of the accounting communication between the service selection network element 315 and the remote database server 320 (e.g., similar to the flow of operations in FIG. 4). As another example, there may be periodic bulk updates sent by the service selection network element 315 to the appropriate providers equipment.

Exemplary Access Networks

The access network may be one or more local area network (LAN), wide area network (WAN), or a combination thereof. As previously indicated, the access network 310 represents any number of different access networks using any number of different types of encapsulations, including DSL, cable, PPPoX, 1483 bridged, DHCP etc.

As previously indicated, CLIPS is a technique for capturing the MAC address of the network cards in computing devices connecting with the service selection network element. Additional detail regarding CLIPS will now be provided. Specifically, CLIPS can be used with a variety of access networks.

For example, CLIPS can be used in with the access network typically implemented in the cable infrastructure. In the cable infrastructure, computing devices are commonly coupled to the service selection network element through a hybrid fiber coaxial cable (HFC) network and a cable modem transmission system (CMTS). Accordingly, communications between the computing devices and the service selection network element are routed through the HFC network and the CMTS. The HFC network in a cable infrastructure typically combines the radio frequency (RF) data communications of a number of computing devices that are forwarded to the CMTS; the CMTS converts the RF data communications into data packets, such as Internet Protocol (IP) packets, to be routed by the service selection network element.

As another example, CLIPS can be used with an access network that employs DSL/Asynchronous Transfer Mode (ATM) and Ethernet. In such an access network, computing devices are commonly coupled to the service selection network element through a Digital Subscriber Line Access Multiplexer (DSLAM) and an Asynchronous Transfer Mode (ATM) network. The DSLAM combines a number of DSL communications into a single ATM transmission. The ATM network comprises a number of communication links for routing data based on the ATM protocol. The computing devices are communicatively coupled to the service selection network element through Ethernet communications.

These exemplary access networks are by way of example and not by way of limitation, as CLIPS can be used with other systems based on other types of protocols and having other types of configurations. For example, CLIPS can be used with a wireless infrastructure, wherein wireless concentrators can route data from client devices into the service selection network elements described herein.

When using CLIPS, subscribers are identified individually based on an identification of the computing device, such as the Media Access Control (MAC) address of the networking card within the computing device. As will be described in more detail below, this identification is converted into a username that is unique to the subscriber such that the subscriber can be assigned a source address that is associated with this username. Accordingly, subscribers can be individually identified to allow for individualized treatment, including rate limiting, policing values and access control lists on a per subscriber basis. Moreover, such treatment is independent of the need to include specific hardware and/or software on the computing machine.

When using CLIPS, the authentication operations of FIG. 3 involve the service selection network element 315 and the remote database server 320 swapping a number of different messages as well as performing a number of operations. In particular, responsive to the service selection network element 315 receiving an address request message from a computing device 305, the service selection network element 315 transmits a request for context message to the remote database server 320. The remote database server 320 responds with a bind to context message back to the service selection network element 315. In response, the service selection network element 315 performs a bind operation to bind the assigned address for the given subscriber to the interface for the identified context. In addition, the service selection network element 315 transmits a return address message back to the computing device. A more detailed description of these messages and operations is set forth below.

In particular, the request for an address from the computing device is provided to the control modules 358. This request includes an identifier of the computing device 305 that sent it (the client identifier). For instance, the identifier of the computing device may be the Media Access Control (MAC) Address of customer premise equipment (such as the network card) within that computing device. For example, the request may be based on the Dynamic Host Configuration Protocol (DHCP), which allows for the assignment of Internet Protocol (IP) addresses to clients being coupled to a network, as is known in the art. Where DHCP is used, the request may be a DHCP discover request, which is requesting an IP address from the service selection network element 315.

Responsive to this request, the service selection network element 315 generates a subscriber identifier based on the client identifier. For instance, the subscriber identifier may be a number of text characters that correspond to the client identifier generated using any number of a variety of different techniques. For example, where the client identifier is a MAC address, such as "112233445566" (which is comprised of 6 hexadecimal numbers having 12 hexadecimal nibbles), the control module(s) 358 generate the following text characters: "11:22:33:44:55:66", wherein each hexadecimal nibble is converted to a character that corresponds to the hexadecimal value (0-9 and A-F). As another example, different ciphering operations, etc. To help illustrate, the control module(s) 358 could convert the hexadecimal values from the MAC address to a binary value and add a constant value to this binary value and convert the individual binary values into a corresponding text character.

In addition, the control module(s) 358 transmit the subscriber identifier to the remote database server 320, which retrieves that subscribers set of policies (including the context) a previously described. The remote database server 320 transmits the bind to context message (including the set of policies) back to the control module(s) 358.

Responsive to this message, the service selection network element 315 assigns an address to the subscriber based on the identified context. As described above, a given context 355 can comprise a number of subnets that can comprise a number of addresses. Thus, one of the addresses from one of the addresses of subnets, which is not currently assigned, is selected for assignment to the current subscriber.

In addition, a virtual circuit is generated between the computing device 305 and the service selection network element 315. In certain implementations, a given subscriber session has a one-to-one correspondence to a given virtual circuit and a given transmission line (a real circuit) can include a number of virtual circuits. In such implementations, when a computing device is assigned an address for a given subscriber session, data packets received and transmitted from that computing device include this address in order to associate the data packets with the subscriber session (and therefore the associated virtual circuit). In particular, as part of the generation of the virtual circuit, the requested address is transmitted back to the computing device in the return address message. For instance, where the DHCP protocol is employed for the assignment of the address, the service selection network element 315 generates a DHCP offer request that is transmitted back to the requesting one of the computing devices 305. In turn, if that computing device accepts the address, that computing devices transmits a response back to the service selection network element 315. The service selection network element 315 transmits back an acknowledgement of this acceptance.

Thus, since domainless service selection is agnostic for access encapsulation (it does not require the structure PPP usernames), it works with access technologies other than PPP (e.g., DHCP in the cable infrastructure.). When DHCP is combined with CLIPS, the DHCP environment becomes dynamic for subscribers. Since, from the DHCP point of view, there is no mechanism to "signal" the service selection network element for a change in service other than the web portal, the web portal in conjunction with the service selection network element translate the request into a structure username towards the destination provider.

Exemplary Service Selection Network Element Architectures

The service selection network element 315 can be implemented a variety of ways. By way of example, and not limitation, one such exemplary implementation is described below. Specifically, the service selection network element includes a number of traffic cards, a set of one or more control cards, and a set of one or more forwarding cards. Each of the traffic cards and the forwarding card can include a processor and memory. The traffic cards, the control card(s), and the forwarding card are coupled to system bus(es). The control card performs control, system configuration and management tasks for the network element. For example, if the forwarding card needs to be updated with a new Internet Protocol (IP) address table, such data is received by the control card and transmitted to the forwarding card, wherein such data is updated therein.

The forwarding card 212 provides for buffering, packet processing and forwarding of data packets being received by the traffic cards. In particular, the traffic cards can be coupled to a number of data transmission lines, which are coupled to other network elements and/or computing devices. Accordingly, the traffic cards receive and transmit data traffic from and to data transmission lines coupled thereto. Such data traffic is transmitted to the forwarding card, where this traffic can be buffered, processed and/or forwarded to other traffic cards within the service selection network element.

The control card(s) comprises a set of one or more processors, a memory and a control module. The set of processors is coupled to the control module and the memory. The forwarding card is also coupled to the memory. The set of processors may comprise any suitable processor architecture.

The memory is used to store addresses assigned and/or to be assigned to computing devices coupled to the service selection network element. For instance, the memory may store multiple addresses for each of a set of one or more subnets, and each context can include one or more subnets. These addresses may be source Internet Protocol (IP) addresses to be statically and/or dynamically assigned to subscribers.

The control module can be a process or task that can reside within the memory and/or one or more of the set of processors while being executed. However, the control module can also be implemented as different types of hardware (such as digital logic) executing the processing described therein (which is described in more detail below).

Accordingly, the control card may include a machine-readable medium on which is stored a set of instructions (i.e., software) embodying any one, or all, of the methodologies described herein. For example, software can reside, completely or at least partially, within the memory and/or within the set of processors.

This implementation of the service selection network element is an example, and not by way of limitation. Thus, network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The servers as well as the traffic cards, forwarding cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Alternative Embodiments

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
a web portal server operable to implement a web portal, to be coupled to a service selection network element coupled to a plurality of computing devices over an access network and coupled to a set of one or more services provided by a set of one or more providers, where network connectivity to the set of one or more services provided by a set of one or more providers is limited to connecting through the service selection network element, to allow a plurality of subscribers at said plurality of computing devices to perform one or more activities that include the ability to:
login,
select after login between the set of one or more services provided by the set of one or more providers, and
switch after login between the set of one or more services provided by the set of one or more providers,
wherein responsive to the one or more activities performed by a given one of said plurality of subscribers, the web portal to cause a domainless service selection (DLSS) record of that subscriber, which includes a domainless user identifier of the subscriber and a domain name, to be altered to reflect the one or more activities performed including updating the DLSS record to include an IP address assigned to the subscriber's computing device and to cause the service selection network element to attempt to connect the subscriber accordingly, wherein there are at least two in at least one of the set of services and the set of providers, and wherein the domainless user identifier is based on one or more of a MAC address of that subscriber's computing device, a domainless PPP username of that subscriber, and a circuit identifier for that subscriber's computing device.

2. The apparatus of claim 1, wherein said web portal causes the record to be altered to include a domain name of one or more of the selected service, selected provider, switched service, and switched provider and authentication to occur using a domainless user identifier based on data in said record merged with said domain name to form a network address.

3. The apparatus of claim 1, wherein said web portal causes the record to be altered to indicate a successful login.

4. A method comprising:
receiving, at a web portal, login information of a subscriber including a portal username and a portal password, said subscriber being at one of a plurality of computing devices communicating with said web portal through an access network coupled to a service selection network element coupled to said web portal, wherein the subscriber is associated with a domainless service selection (DLSS) record that includes a domainless user identifier of the subscriber, a domain name of a service provider, and a set of one or more policies, wherein the domainless user identifier is destination independent and is based on one or more of a MAC address of the subscriber's computing device, a domainless PPP username of the subscriber, and a circuit identifier for the subscriber's computing device, wherein the DLSS record is stored in a remote database server with respect to the web portal, wherein the remote database server is coupled to said service selection network element, the set of policies including one or more of, one or more filters, bandwidth, type of usage, and access control lists;
transmitting a record update to the remote database server coupled to said service selection network element to update the DLSS record to include an IP address assigned to the subscriber's computing device; and
transmitting a subscriber reauthorize command from the web portal to said service selection network element to reauthorize the subscriber to update the subscriber's connection in the service selection network element, wherein the subscriber reauthorize command causes the service selection network element to connect the subscriber according to the updated DLSS record.

5. The method of claim 4, wherein the IP address of the subscriber's computing device is captured by the web portal.

6. The method of claim 4, where:
said method further includes receiving a selection of one of a plurality of services provided by a set of one or more providers coupled to said service selection network element, wherein the set of providers providing the selected service includes a different domain name than currently in the DLSS record; and
said transmitting said record update includes said service selection to update the DLSS record to reflect the service selection including changing the domain name in the DLSS record to the different domain name without changing the domainless user identifier to allow the subscriber to use the same domainless user identifier regardless of changes of services.

7. A method comprising:
receiving, at a web portal, login information of a known subscriber including a portal username and a portal password of said known subscriber, said known subscriber being at one of a plurality of computing devices communicating with said web portal through an access network coupled to a service selection network element coupled to said web portal;
verifying said known subscriber based on said received login information;
receiving a selection of one of a plurality of services provided by a set of one or more providers;
transmitting a record update to a remote database server coupled to said service selection network element reflecting the successful login and the selection to update a domainless service selection (DLSS) record for the known subscriber including updating the DLSS record to include an IP address assigned to the subscriber's computing device, wherein the DLSS record includes a domainless user identifier of the subscriber and a domain name of a provider, wherein the domainless user identifier is destination independent and is based on one or more of a MAC address of the subscriber's computing device, a domainless PPP username of the subscriber, and a circuit identifier for the subscriber's computing device; and
transmitting a subscriber reauthorize from the web portal to said service selection network element to reauthorize the subscriber to update the subscriber's connection in the service selection network element.

8. The method of claim 7, wherein the IP address of the known subscriber's computing device is captured by the web portal.

* * * * *